United States Patent
Vineet et al.

(10) Patent No.: US 11,822,620 B2
(45) Date of Patent: Nov. 21, 2023

(54) PERSONALIZED LOCAL IMAGE FEATURES USING BILEVEL OPTIMIZATION

(71) Applicant: MICROSOFT TECHNOLOGY LICENSING, LLC, Redmond, WA (US)

(72) Inventors: Vibhav Vineet, Bellevue, WA (US); Ondrej Miksik, Zurich (CH); Vishnu Sai Rao Suresh Lokhande, Madison, WI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 402 days.

(21) Appl. No.: 17/179,058

(22) Filed: Feb. 18, 2021

(65) Prior Publication Data

US 2022/0261594 A1    Aug. 18, 2022

(51) Int. Cl.
| | |
|---|---|
| *G06N 3/08* | (2023.01) |
| *G06F 18/214* | (2023.01) |
| *G06V 10/40* | (2022.01) |
| *G06T 3/00* | (2006.01) |
| *G06F 18/21* | (2023.01) |
| *G06N 3/045* | (2023.01) |
| *G06V 10/46* | (2022.01) |

(52) U.S. Cl.
CPC .......... *G06F 18/214* (2023.01); *G06F 18/217* (2023.01); *G06N 3/045* (2023.01); *G06N 3/08* (2013.01); *G06T 3/0093* (2013.01); *G06V 10/40* (2022.01); *G06V 10/467* (2022.01)

(58) Field of Classification Search
CPC ..... G06F 18/214; G06F 18/217; G06N 3/045; G06N 3/08; G06T 3/0093; G06V 10/40; G06V 10/467; G06V 10/82

USPC ........................................................ 382/155
See application file for complete search history.

(56) References Cited

U.S. PATENT DOCUMENTS

| | | | |
|---|---|---|---|
| 2019/0147341 A1* | 5/2019 | Rabinovich | ............ G06V 20/10 382/156 |
| 2020/0302628 A1 | 9/2020 | Detone et al. | |

(Continued)

FOREIGN PATENT DOCUMENTS

AU        2018369757 A1    5/2020

OTHER PUBLICATIONS

"HoloLens 2", Retrieved from: https://web.archive.org/web/20201214142309/https://www.microsoft.com/en-us/hololens/, Dec. 14, 2020, 5 Pages.

(Continued)

*Primary Examiner* — Juan A Torres
(74) *Attorney, Agent, or Firm* — SHOOK, HARDY & BACON L.L.P.

(57) ABSTRACT

Embodiments of the present invention provide systems, methods, and computer storage media directed to optimizing the accuracy of local feature detection in a variety of physical environments. Homographic adaptation for facilitating personalization of local feature models to specific target environments is formulated in a bilevel optimization framework instead of relying on conventional randomization techniques. Models for extraction of local image features can be adapted according to homography transformations that are determined to be most relevant or optimal for a user's target environment.

20 Claims, 6 Drawing Sheets

(56) References Cited

U.S. PATENT DOCUMENTS

| | | | | |
|---|---|---|---|---|
| 2020/0356813 | A1* | 11/2020 | Sharma | G06V 10/776 |
| 2020/0364876 | A1* | 11/2020 | Mohan | G06T 7/246 |
| 2021/0216878 | A1* | 7/2021 | Norman | G06N 3/088 |

OTHER PUBLICATIONS

"Magic Leap", Retrieved from: https://web.archive.org/web/20201205011715/https://www.magicleap.com/en-us, Dec. 5, 2020, 9 Pages.

"Oculus Quest 2", Retrieved from: https://web.archive.org/web/20201215061152/https://www.oculus.com/, Dec. 15, 2020, 7 Pages.

"The Visual Localization Benchmark", Retrieved from: https://web.archive.org/web/20201024120114/https://www.visuallocalization.net/, Oct. 24, 2020, 2 Pages.

Balntas, et al., "Hpatches: A benchmark and Evaluation of Handcrafted and Learned Local Descriptors", In Proceedings of the IEEE Conference on Computer Vision and Pattern Recognition, Jul. 21, 2017, pp. 5173-5182.

Bergstra, et al., "Algorithms for Hyper-Parameter Optimization", In Proceedings of Neural Information Processing Systems, Dec. 31, 2011, 9 Pages.

Bertsekas, Dimitri P., "Nonlinear Programming", In Journal of the Operational Research Society, vol. 48, Issue 3, Mar. 1, 1997, 1 Page.

Bousmalis, et al., "Unsupervised Pixellevel Domain Adaptation with Generative Adversarial Networks", In Proceedings of the IEEE conference on computer vision and pattern recognition, Jul. 21, 2017, pp. 3722-3731.

Bromley, et al., "Signature Verification Using a "Siamese" Time Delay Neural Network", In Proceedings of the 6th International Conference on Neural Information Processing Systems, 1994, pp. 737-744.

Csurka, Gabriela, "A Comprehensive Survey on Domain Adaptation for Visual Applications", In Book Domain Adaptation in Computer Vision Applications, Sep. 13, 2017, pp. 1-35.

Cubuk, et al., "AutoAugment: Learning Augmentation Policies from Data", In Repository of arXiv:1805.09501v1, May 24, 2018, 14 Pages.

Detone, et al., "Superpoint: Self-supervised Interest Point Detection and Description", In Proceedings of the IEEE Conference on Computer Vision and Pattern Recognition Workshops, Jun. 18, 2018, pp. 337-349.

Dusmanu, et al., "D2-net: A Trainable CNN for Joint Description and Detection of Local Features", In Proceedings of the IEEE Conference on Computer Vision and Pattern Recognition, 2019, pp. 8092-8101.

El-Sobky, et al., "A Penalty Method with Trust-Region Mechanism for Nonlinear Bilevel Optimization Problem", In Journal of Computational and Applied Mathematics, vol. 340, Oct. 2018, pp. 360-374.

Ganin, et al., "Unsupervised Domain Adaptation by Backpropagation", In Proceedings of the 32nd International Conference on Machine Learning, Jul. 6, 2015, 10 Pages.

Hartley, et al., "Multiple View Geometry in Computer Vision", In Publication of Cambridge University Press, 2003, 48 Pages.

Jaderberg, et al., "Spatial Transformer Networks", In Proceedings of Advances in Neural Information Processing Systems, Dec. 7, 2015, 9 Pages.

Jang, et al., "Categorical Reparameterization with Gumbel-Softmax", In Repository of arXiv:1611.01144v1, Nov. 3, 2016, pp. 1-13.

Barroso-Laguna, et al., "Key. net: Keypoint Detection by Handcrafted and Learned CNN Filters", In Proceedings of IEEE/CVF International Conference on Computer Vision (ICCV), Oct. 27, 2019, pp. 5836-5844.

Lee, et al., "Learning Augmentation Network via Influence Functions", In Proceedings of the IEEE/CVF Conference on Computer Vision and Pattern Recognition, Jun. 2020, pp. 10961-10970.

Li, et al., "Dada: Differentiable Automatic Data Augmentation", In Repository of arXiv:2003.03780v1, Mar. 8, 2020, pp. 1-16.

Lin, et al., "Microsoft COCO: Common Objects in Context", In Proceedings of 13th European Conference on Computer Vision, Sep. 6, 2014, pp. 740-755.

Long, et al., "Conditional Adversarial Domain Adaptation", In Advances in Neural Information Processing Systems, Dec. 3, 2018, 11 Pages.

Lorraine, et al.,"Hyperparameter Optimization with Hypernets", In 31st Conference on Neural Information Processing Systems (NIPS 2017), Workshop on Meta-learning. Long Beach, Dec. 4, 2017, pp. 1-7.

Lowe, David G, "Distinctive Image Features from Scale-Invariant Keypoints", In International Journal of computer vision, vol. 60, Issue 2, Nov. 1, 2004, pp. 1-28.

Mackay, et al., "Self-Tuning Networks: Bilevel Optimization of Hyperparameters Using Structured Best-Response Functions", In Repository of arXiv:1903.03088v1, Mar. 7, 2019, pp. 1-25.

Maddison, et al. "The Concrete Distribution: A Continuous Relaxation Of Discrete Random Variables", In Repository of arXiv: 1611.00712v1, Nov. 2, 2016, 17 Pages.

Mehra, et al., "Penalty Method for Inversion-Free Deep Bilevel Optimization", In Repository of arXiv:1911.03432v1, Nov. 8, 2019, 16 Pages.

Mishchuk, et al., "Working Hard to Know Your Neighbor's Margins: Local Descriptor Learning Loss", In Proceedings of 31st Conference on Neural Information Processing Systems, Dec. 2017, pp. 1-12.

Noh, et al., "Large-Scale Image Retrieval with Attentive Deep Local Features", In Proceedings of the IEEE International conference on computer vision, Oct. 22, 2017, pp. 3456-3465.

Ono, et al., "Lf-net: Learning Local Features from Images", In Proceedings of Annual Conference on Neural Information Processing Systems, Dec. 3, 2018, pp. 1-11.

Radenovic, et al., "Revisiting Oxford and Paris: Large-scale Image Retrieval Benchmarking", In Proceedings of the IEEE Conference on Computer Vision and Pattern Recognition, Jun. 18, 2018, pp. 5706-5715.

Revaud, et al., "R2d2: Repeatable and Reliable Detector and Descriptor", In Repository of arXiv:1906.06195v2, Jun. 17, 2019, pp. 1-12.

Sattler, et al., "Benchmarking 6DOF Outdoor Visual Localization in Changing Conditions", In Proceedings Of the IEEE Conference on Computer Vision and Pattern Recognition (CVPR), June 18, 2018, pp. 8601-8610.

Sattler, et al., "Image Retrieval for Image-Based Localization Revisited", In Electronic Proceedings of the British Machine Vision Conference, Sep. 2012, pp. 1-12.

Shewchuk, Jonathan R. , "An Introduction to the Conjugate Gradient Method without the Agonizing Pain", In Technical Report of Carnegie Mellon University, Aug. 4, 1994, pp. 1-17.

Singh, et al., "Autosimulate:(quickly) Learning Synthetic Data Generation", In Repository of arXiv:2008.08424v1, Aug. 16, 2020, pp. 1-17.

Sinha, et al., "A review on Bilevel Optimization: From Classical to Evolutionary Approaches and Applications", In Journal of IEEE Transactions on Evolutionary Computation, vol. 22, Issue 2, Apr. 2018, pp. 276-295.

Tian, et al., "L2-net: Deep learning of Discriminative Patch Descriptor in Euclidean Space", In Proceedings of the IEEE Conference on Computer Vision and Pattern Recognition, Jul. 21, 2017, pp. 661-669.

Yang, et al., "Learning to Generate 3D Training Data Through Hybrid Gradient", In Proceedings of the IEEE/CVF Conference on Computer Vision and Pattern Recognition, 2020, pp. 779-789.

Yi, et al., "LIFT: Learned Invariant Feature Transform", In Journal of Computing Research Repository, Mar. 2016, pp. 1-16.

Zhang, et al. "Reference Pose Generation for Visual Localization via Learned Features and View Synthesis", In Repository of arXiv:2005.05179v1, May 11, 2020, pp. 1-23.

Cubuk, et al., "RandAugment: Practical Data Augmentation with No Separate Search", In Repository of arXiv:1909.13719v1, Sep. 30, 2019, 12 pages.

(56) References Cited

OTHER PUBLICATIONS

Mounsaveng, et al., "Learning Data Augmentation with Online Bilevel Optimization for Image Classification", In Proceedings of Winter Conference on Applications of Computer Vision, Jan. 3, 2021, pp. 1690-1699.

"International Search Report & Written Opinion issued in PCT Application No. PCT/US22/011886", dated Apr. 29, 2022, 13 Pages.

* cited by examiner

PERSONALIZED LOCAL IMAGE FEATURES USING BILEVEL OPTIMIZATION

BACKGROUND

Local features are patterns or distinct structures found in images, and can include points, edges, or blobs, among other things. They are typically associated with an image patch that is distinguishable from its immediate surroundings by texture, color, and/or intensity. A variety of technologies relying on optical sensors to facilitate localization and mapping, among other things, may also rely on the ability to accurately detect local features. By way of non-limiting example, immersive technologies that enable virtual reality (VR), augmented reality (AR), or mixed reality (MR), are being used in a wide range of conditions and environments, from factories and hospitals, to offices and homes, whether indoor or outdoor, and despite weather or lighting conditions. To provide the users with immersive experiences, devices such as head-mounted displays can map physical environments and localize themselves against these maps. In an ideal world, algorithms would perform local feature detection well, irrespective of the environmental conditions (such as those aforementioned) in which the operation is being performed. However, generic algorithms generally don't perform equally well across different environments and conditions. Thus, it is highly desirable to be able to effectively adapt the algorithms to a user's specific environment.

SUMMARY

Embodiments of the present invention relate to systems and methods for adapting local features to a particular environment for improving local feature detection, among other things. More specifically, embodiments described herein can adapt or in other words tune, for a target environment, models employed for the extraction of local image features from the target environment based on homography transformations that are determined to be most relevant to the target environment. In various embodiments, a bi-level optimization framework can be employed to determine optimal transformations that are specific to a user's target environment, so that local feature detection accuracy within the target environment can be optimized.

In an embodiment, a set of training images employed to train a local feature detector and descriptor model (i.e., local feature network) is obtained. Each training image of the set of training images is paired with an optimal transformation of the image, which can be determined utilizing a differential warping model or network. The set of training images and their determined optimal transformations are stored as a set of training image pairs. In some embodiments, each training image pair can be stored with an optimal transformation matrix that defines the determined optimal transformation (e.g., a homography transformation matrix) for the training image. The optimal transformation matrix of a training image can be determined via a differentiable warping network (DWN) based on a set of differentiable warping network parameters.

A set of validation images that are captured within a target environment is also be obtained. Each validation image of the set of validation images is paired with a homographic transformation of the image, which is determined based on a ground truth homography transformation matrix that defines a relationship between the images in the pair. The set of validation images and their determined homographic transformations can be stored as a set of validation image pairs. In some embodiments, each validation image pair can be stored with the ground truth homography transformation matrix that defines the relationship of the images in the validation image pair.

In a further embodiment, a bilevel optimization objective associated with the local feature network is determined based on the set of validation image pairs and the set of training image pairs. The bilevel optimization objective can be determined by comparing local features across image pairs from each of the training image pairs and validation image pairs. A first gradient for the DWN parameters and a second gradient for the local feature network parameters can be calculated based on the determined bilevel optimization objective. The DWN parameters can be updated utilizing the calculated first gradient, and the local feature network parameters can be updated utilizing the calculated second gradient.

In some further embodiments, the above-noted steps can be repeated until each of the first and second gradients equal zero, or in other words, there are no further changes in the DWN parameters and/or the local feature network parameters. In this regard, the local feature network has been tuned such that local feature detection accuracy within the target environment is optimized.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Immersive technologies, such as mixed reality (MR), is becoming ubiquitous. The Microsoft HoloLens, by way of example, is being increasingly used in a wide range of conditions and operating environments. To provide the users with immersive experiences, these such devices have to be able to precisely map the environment and localize themselves against these maps. While it is desirable to employ algorithms that work well across as wide of a range of environmental conditions as possible, varying environmental conditions might represent unique challenges with which generic algorithms may not be able to cope. For instance, an algorithm may work better in an environment with substantial sunlight as opposed to one with a small table lamp as its only light source. Thus, it is highly desirable to be able to effectively adapt algorithms to user's specific environments.

Visual localization and mapping have traditionally relied on local image features to establish correspondences between images. Many local feature extractors have been proposed over the years, from handcrafted methods (e.g., SIFT) to more recent deep learning models (e.g., SuperPoint, KeyNet, D2-Net, or R2D2). In general, deep learning approaches typically formulate the training as a self-supervised learning problem. To this end, these models take pairs of images related by homography transformations and optimize loss functions corresponding to two-view repeatability and matching scores. This process thus efficiently overcomes the challenges with ground-truth data acquisition by exploiting the fact that a large set of homography transformations can be generated synthetically during the training process for arbitrary image data. While one skilled in the art could appreciate that a self-supervised procedure is a benefit, one problem with this approach is that the space from which the homography transformations are randomly sampled is extremely large. Moreover, identifying the precise types of transformations which would lead to high accuracy in a user's target environment is impossible apriori. In other words, one would need to sample an extremely large number of transformations, which makes the direct applicability of such an approach to personalization of local features prohibitively expensive.

The systems and methods described in the present disclosure are developed on the premise that not all (random) homography transformations contribute equally to the training of local feature models. Evidence suggests that different homography transformations can lead to different accuracies, and thus, an underlying motivation of the present disclosure is to predict transformations that can effectively help personalize local features to a specific user's environment. Embodiments described herein relate to systems and methods for personalizing baseline local feature models to a user's specific target environment. In this regard, provided with a validation set from the user's environment, the space of transformations that are relevant and important from the validation set's point of view can be predicted. Embodiments frame this "personalization" problem into what is referred to herein as a bilevel optimization framework. The outer operations of the bilevel optimization framework find the optimal transformations that are the most relevant to the validation set. The inner operations of the bilevel framework utilize these transformations during the training of the local feature network. The differentiable approximation of the bilevel optimization problem is derived and solved utilizing a penalty function approach. Applications of the various embodiments described herein have demonstrated significant improvement in local feature detection, sometimes demonstrating 10-20% improvement in accuracy over pre-trained local feature models depending on size of the validation set, among other things.

Accordingly, some embodiments of the present invention are directed to one or more computer storage media storing computer-useable instructions that, when used by one or more computing devices, cause the one or more computing devices to perform operations for improving the accuracy of local feature detection in variable environmental conditions. The operations include, among other things, obtaining a set of training images that were previously utilized to train a local feature detector and descriptor model (e.g., a local feature network). A set of training image pairs is generated based on the set of training images, whereby each training image pair of the generate set of training image pairs includes one training image from the set of training images and a determined optimal transformation matrix of the training image. The determined optimal transformation matrix is employed to generate an optimal transformation of the training image, and the training image is paired with its optimal transformation. As will be described, an optimal transformation matrix for a training image can be determined based on, among other things, a set of parameters defined in a differentiable warping network (DWN). A set of validation image pairs is obtained, whereby each validation image pair in the set of validation image pairs includes a pair of images from the target environment and a ground truth transformation matrix that defines the relationship between the images in the pair of images. A bi-level optimization objective associated with the local feature network is determined based on the generated set of training image pairs and the obtained set of validation images. A first gradient for the DWN parameters and a second gradient for the local feature network parameters are calculated based on the determined bi-level optimization objective. Utilizing the calculated first and second gradients, the DWN parameters and the local feature network parameters are respectively updated.

In other embodiments of the invention, aspects are directed to a system and a computer-implemented method. The system comprises: one or more processors; and one or more computer storage media storing computer-useable instructions that, when used by the one or more processors, cause the one or more processors to perform a method, which includes obtaining a set of training images that were previously utilized to train a local feature detector and descriptor model (e.g., a local feature network). A set of training image pairs is generated based on the set of training images, whereby each training image pair of the generate set of training image pairs includes one training image from the set of training images and a determined optimal transformation matrix of the training image. The determined optimal transformation matrix is employed to generate an optimal transformation of the training image, and the training image is paired with its optimal transformation. As will be described, an optimal transformation matrix for a training image can be determined based on, among other things, a set of parameters defined in a differentiable warping network (DWN). A set of validation image pairs is obtained, whereby each validation image pair in the set of validation image pairs includes a pair of images from the target environment and a ground truth transformation matrix that defines the relationship between the images in the pair of images. A bi-level optimization objective associated with the local feature network is determined based on the generated set of training image pairs and the obtained set of validation images. A first gradient for the DWN parameters and a second gradient for the local feature network parameters are calculated based on the determined bi-level optimization objective. Utilizing the calculated first and second gradients, the DWN parameters and the local feature network parameters are respectively updated.

In some other embodiments of the invention, aspects are directed to another system and another computer-implemented method. The system (e.g., a HMD) comprises: one or more processors; and one or more computer storage media storing computer-useable instructions that, when used by the one or more processors, cause the one or more processors to perform a method, which includes receiving a pair of images captured via a sensor (e.g., an optical sensor). The images in the pair can be received from the sensor or captured by way of the sensor coupled to the one or more processors. A ground truth transformation matrix defining a homographic relationship between each image in the pair of images can be determined. The homographic relationship can be determined based on tracking data or maps detected and/or received from one or more different sensors coupled to the one or more processors. The pair of images and the ground truth transformation matrix, among other things, can be communicated to a different computing device, whether directly coupled to the one or more processors or via a network. As described in accordance with some embodiments, the different computing device can generate at least one training image pair based on at least one training image from a set of training images that were previously utilized to train a local feature detector and descriptor model (e.g., a local feature network) employed by the system (e.g., the HMD) to facilitate feature detection, among other things. The training image pair can include the one training image and a determined optimal transformation matrix of the training image. The determined optimal transformation matrix is employed to generate an optimal transformation of the training image, and the training image is paired with its optimal transformation. In accordance with various embodiments, the optimal transformation matrix for the training image can be determined based on, among other things, a set of parameters defined in a differentiable warping network (DWN) of the different computing device. The different computing device can receive the pair of images (e.g., the validation image pair) communicated thereto. A bi-level optimization objective associated with the local feature network is determined based at least in part on the generated training image pair and the obtained pair of images (e.g., the validation image pair). A first gradient for the DWN parameters and a second gradient for the local feature network parameters are calculated based on the determined bi-level optimization objective. The different computing device can communicate the calculated second gradient to the system (e.g., the HMD) so that the one or more processors can update the local feature network based on the calculated second gradient. More so, the different computing device can update the DWN parameters for the DWN utilizing the calculated first gradient. Among other things, the one or more processors (e.g., of the HMD) can employ the updated local feature network to demonstrate improved accuracy for feature detection within the target environment (i.e., the local physical environment of the HMD).

Figure 1:
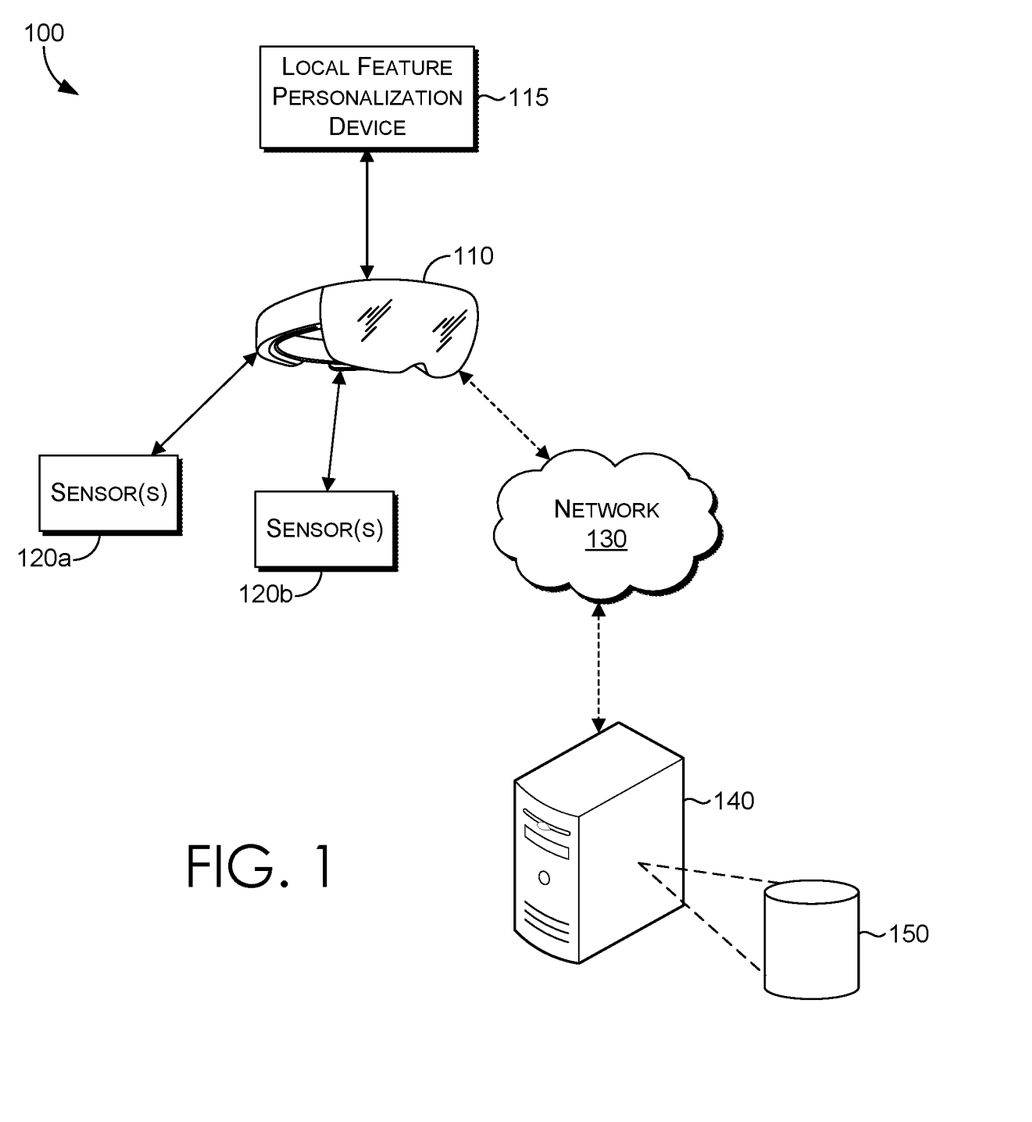
FIG. 1 is a block diagram of an exemplary operating environment for improving accuracy of local feature detection in accordance with some embodiments of the present disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a head-mounted display (HMD) coupled to a set of sensors, such as HMD 110 and sensor(s) 120a, 120b. The HMD 110 can include a stereoscopic display to facilitate a stereoscopic presentation of three-dimensional virtual or augmented environments, and virtual or augmented objects that can be perceived by a user wearing the HMD 110. The HMD 110 can be coupled to a local feature personalization device 115, which can be integrated into a body of the HMD 110, separate from the HMD 110 but physically coupled thereto, or wirelessly coupled to the HMD 110, to facilitate a tuning or an optimization of local image feature detection in a user's current physical environment. In some aspects, the local feature personalization device 115 coupled to the HMD 110 can include a portable computing device, e.g., one that is carried or worn on the person of a user wearing the HMD 110.

In various embodiments, the set of sensors can include tracking sensors 120a (e.g., rotational tracking sensors, positional tracking sensors) that can generate sensor data employable by the local feature personalization device 115 to determine a physical orientation of the HMD 110 and a physical position of the HMD 110 relative to the physical environment around it. In an embodiment, the tracking sensors 120a can include inside-out sensors, with sensors that are secured to a body of the HMD 110. However, it is contemplated that a variety of sensors, including outside-in sensors, can be employed to facilitate the determination of, among other things, a physical orientation and/or physical position of the HMD 110.

In various embodiments, the set of sensors can further include a set of environmental sensors 120b (e.g., acoustic sensors for sonar, radio wave sensors for radar, optical sensors) employable to receive environmental data (e.g., acoustic data, radio wave data, optical data) from the surrounding physical environment and determine, among other things, distances or other characteristics of physical objects within a tracking area (e.g., field of view, range of detection) of the environmental sensor. In some aspects, environmental data can include a depth map or other three-dimensional mesh, from which distances or other characteristics of physical objects within the tracking area can be determined. By way of non-limiting example, the Microsoft Kinect® device is one exemplary environmental sensor (e.g., a depth map sensor or RGBD camera) that can continuously generate a real-time depth map for each frame of optical input information received thereby. In this regard, the local feature personalization device 115 can receive each depth map frame generated by the environmental sensor to determine, among other things, distances, shapes, relative movements, or other physical characteristics of physical objects within the tracking area (e.g., field of view). In some further embodiments, the set of environmental sensors 120b can include an optical sensor (e.g., a camera) that can generate image data based on light received from the surrounding physical environment. Among other things, the optical sensor can generate image data that represents the visual aspects (e.g., color, shape, texture) of the physical environment within its field of view.

In some aspects, an environmental sensor can also be employed by the local feature personalization device 115 as a positional tracking sensor, by determining that a position of the HMD is moving relative to the physical environment being tracked by the environmental sensor. In an embodiment, the set of environmental sensors 120b are inside-out sensors, which include sensor(s) that are secured to a body of the HMD 110. In some aspects, the set of environmental sensors is rigidly mounted to the HMD 110, aimed at a parallel view direction to the HMD 110. However, it is contemplated that a variety of sensors, including outside-in sensors, can be employed to facilitate the determination of, among other things, distances (e.g., relative to the HMD 110) or other characteristics (e.g., visual) of physical objects within corresponding tracking area(s) of the environmental sensor(s) 120b.

In some embodiments, the local feature personalization device 115 can be hosted by a different computing device, such as a separate computing device or a remote server device, like server device 140. The inputs from one or more sensors 120a, 12b can be communicated to and/or accessed by the local feature personalization device 115 via a network 130, which can include a LAN, WAN, PAN, or the Internet, by way of example. The server device 140, or the different computing device, can be coupled to a database 150 that can store, among other things, images (e.g., training images, validation images), depth maps, homographic matrices, models, network parameters, or any other electronic data that can be accessed and/or retrieved by the local feature personalization device 115. In some embodiments, data (e.g., images, location data) can be obtained by the HMD 110 and communicated to the server device 140, or the different computing device, causing the server device 140 or the different computing device to perform one or more operations of the local feature personalization device 115, as will be described herein. In various embodiments, it is contemplated that communications between the different computing device (e.g., server device 140), HMD 110, and/or local feature personalization device 115 can be facilitated via the network 130. In some aspects, the different computing device and database 150 can serve as a data storage device for facilitating the transfer of data to and from the HMD 110 and/or local feature personalization device 115, among other things.

As was noted herein, there is an apparent need to determine optimal transformations that are specific to a current physical environment of a user (of the HMD), so that the accuracy of local feature detection taking place in the current physical environment can be optimized. In this regard, the local feature personalization device 115 can determine, among other things, optimal transformations (i.e., optimal transformation matrices) for one or more training images that were employed to train a local feature network, or in other words, a local feature detector and descriptor model of the HMD 110. In accordance with various embodiments, the local feature personalization device 115 can employ a differentiable warping network (DWN) to determine the one or more optimal transformations for one or more of the training images.

Figure 2:
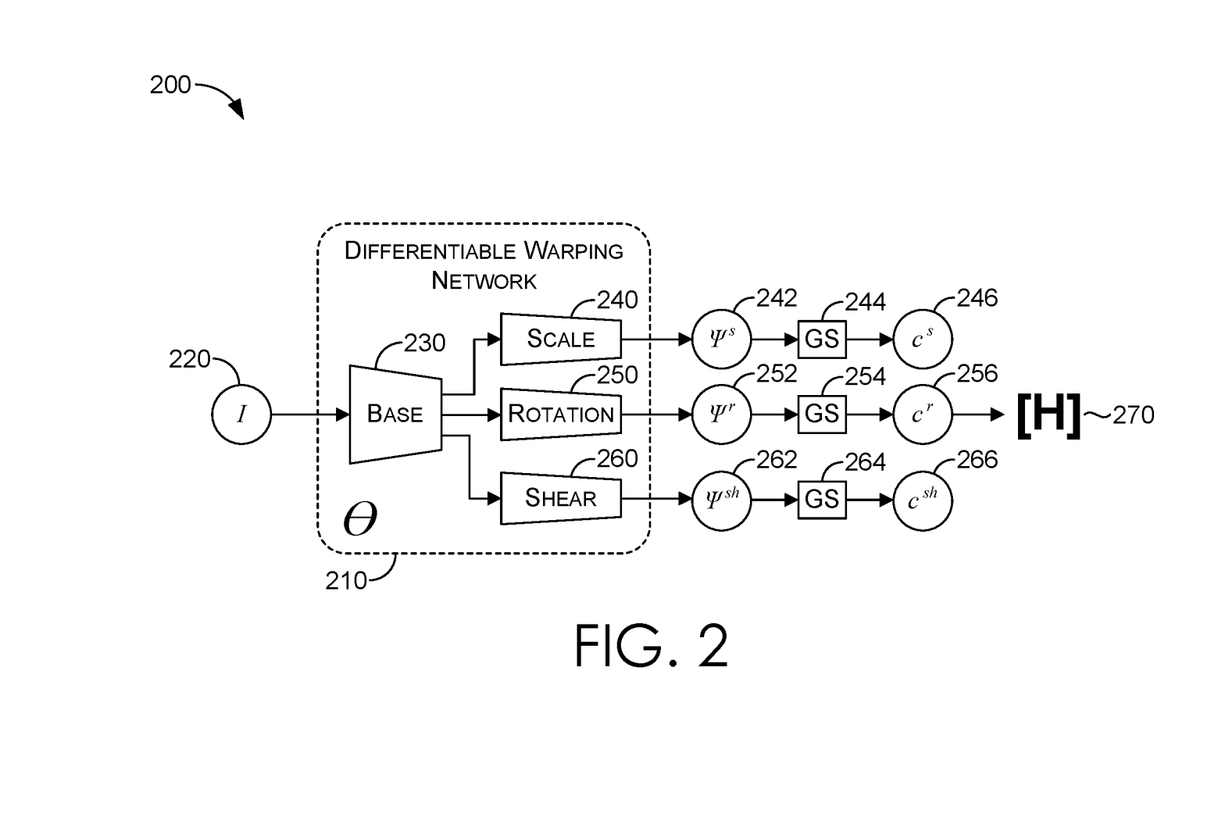
FIG. 2 is an illustration of a differential warping network for generating an optimal homography matrix in accordance with some embodiments of the present disclosure.

Turning now to FIG. 2, a flowchart 200 is provided, which depicts a differential warping network (DWN) 210 for generating an optimal homography matrix, which can be employed to generate an optimal transformation of a given image 220 ("I"). The DWN 210 can be defined with a set of parameters 230 ("θ"). In various embodiments, the given image 220 can correspond to one of a plurality of training images employed to train a local feature network employed by a local feature personalization device, such as local feature personalization device 115 of FIG. 1. The flowchart 200 demonstrates a typical process flow, employed by a local feature personalization device (e.g., local feature personalization device 115 of FIG. 1) that facilitates the learning of optimal homography parameters, which maximize accuracy of local features for the user's current physical environment (also referred to herein as the "target environment").

In accordance with various embodiments, the DWN 210 can include a convolutional network for extracting the features of a given image 220 as a base 230. While a two layer convolutional network is described herein as an exemplary embodiment, it is contemplated that any convolutional network can be employed within various embodiments of the present disclosure. On top of the base, the DWN can further include various fully connected layers, such as scale 240, rotation 250, and shear 260. While not depicted in DWN 210, it is contemplated that other transformations such as translation or reflection can be incorporated as additional layers. In various embodiments, the types and number of transformations employed for the connected layers should not be limiting and can vary, depending on implementation.

In some embodiments, the output of DWN 210 can include a tuple ($\psi^s$, $\psi^r$, $\psi^{sh}$) of probability vectors. The scale probability vector 242 ("$\psi^s$") can correspond to the K bins in scale transformation, the rotation probability vector 244 ("$\psi^r$") can correspond to the K bins in rotation transformation, and the shear probability vector 246 ("$\psi^{sh}$") can correspond to the K bins in shear transformation. In some further embodiments, a Gumbel-softmax operation 244, 254, 264 can be applied to each of the probability vectors 242, 244, 246 to determine one-hot vectors 246, 256, 266 ("$c^s$", "$c^r$", "$c^{sh}$"), respectively. The first one-hot vector 246 ("$c^s$") can be drawn from the categorical distribution parameterized by the scale probability vector 242 ("$\psi^s$"). The one-hot vector can help select a precise bin from among K available bins for the scale transformation. The second one-hot vector 256 ("$c^r$") can be drawn from the categorical distribution parameterized by the rotation probability vector 252 ("$\psi^r$"). The second one-hot vector can help select a precise bin from among K available bins for the rotation transformation. Lastly, the third one-hot vector can help select a precise bin from among K available bins for the shear transformation. The third one-hot vector 266 ("$c^{sh}$") can be drawn from the categorical distribution parameterized by the shear probability vector 262 ("$\psi^{sh}$"). With these one hot vectors 246, 256, 266, the DWN 210 can select the bins defined by the one hot vectors 246, 256, 266, and generate an optimal homography transformation matrix 270 for the given input image 220.

Figure 3:
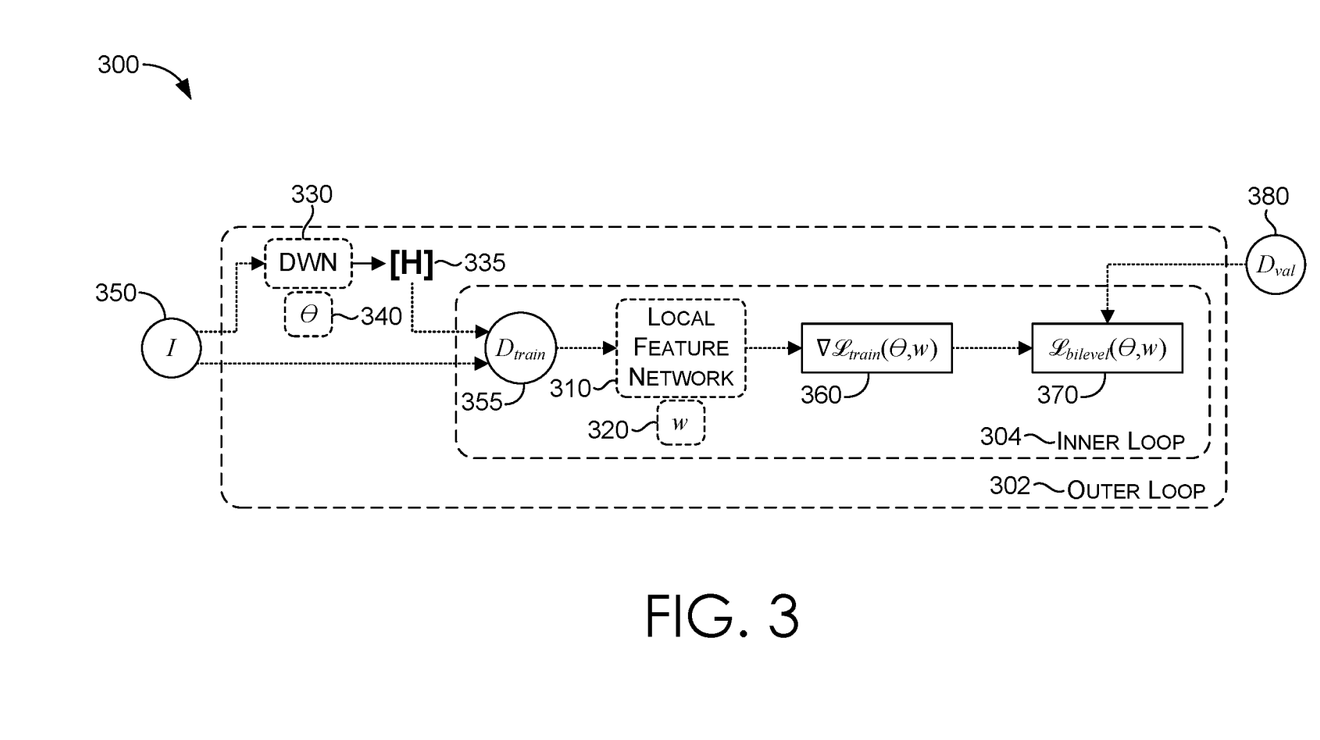
FIG. 3 is an illustration of a bilevel optimization framework for improving the accuracy of local feature detection in accordance with some embodiments of the present disclosure.

Moving now to FIG. 3, a flowchart 300 is provided, which depicts a bilevel optimization framework 300 for improving the accuracy of local feature detection, in accordance with various embodiments described herein. At a high level, a local feature personalization device, such as local feature personalization device 115 of FIG. 1, is configured to adapt a local feature network 310 (i.e., local feature detector and descriptor model) having a set of weights $w$ (i.e., local feature network parameters 320) to personalize to a specific user's environment.

To simulate the user's environment, a set of validation images can be obtained, comprising pairs of images that are related by ground-truth homography. Provided with a set of training images ("$D_{train}$") and a set of validation images ("$D_{val}$"), the local feature personalization device can adopt a bilevel optimization framework, such as bilevel optimization framework 300. The bilevel optimization framework 300 can include an outer loop 302 and an inner loop 304 that are recurrently processed to personalize the local feature network to the user's environment. In setting up the bilevel optimization framework, one can frame the personalization effort into the following bilevel optimization problem:

$$\text{Outer Problem: } \min_{\theta} \mathcal{L}_{val}(I, w^*(\theta))$$

$$\text{Inner Problem: } w^* = \operatorname{argmin}_{w} \mathcal{L}_{train}(I, \theta, w)$$

In accordance with the above, $\mathcal{L}_{train}$ can correspond to a loss defined on a set of training images $D_{train}$, $\mathcal{L}_{val}$ can correspond to the loss defined on a set of validation images $D_{val}$, and $w$ can represent the local feature network parameters of the local feature network. It is contemplated that two sets of parameters may need to be optimized: a $\theta$ that corresponds to DWN parameters for the DWN, and a $w$ that corresponds to the local feature network parameters for the network predicting local features (i.e., the local feature network). Looking now to the inner problem, the local feature network can be trained with weights $w$ (i.e., local feature network parameters), and an optimal set of weights $w^*$ (i.e., an optimal set of local feature network parameters) can be computed. It is noted that $w^*$ can be a function of $\theta$, in accordance with the described embodiments. Looking now to the outer problem, the optimal transformation $\theta$ for the set of training images $D_{train}$ can also be determined, to minimize the validation set loss $\mathcal{L}_{val}$.

A local feature personalization device in accordance with embodiments described herein can further employ a penalty function framework, whereby the inner loop 304 can be incorporated as a constraint into the objective by penalizing for the stationary point value of the constraint. In this regard, the inner and outer loops of the bilevel optimization problem, as noted above, can be transformed into the following:

$$\text{Bilevel Optimization Problem: } \mathcal{L}_{val}(w^*(\theta)) + \gamma \|\nabla_w \mathcal{L}_{train}(\theta, w)\|^2$$

It is contemplated here that a hyper-parameter $\gamma$ can be introduced, to control the importance of an individual objective function in this apparent multi-objective problem. In order to solve the bilevel optimization problem as indicated here, embodiments of the present disclosure can employ a stochastic gradient descent ("SGD") to alternatively update for the optimal transformation $\theta$ value(s) and the weights $w$ value(s) (i.e., local feature network parameters).

Computing the gradient $\nabla_\theta \mathcal{L}_{val}$ can involve backpropagation through $\psi$, as follows:

$$\frac{\partial \mathcal{L}_{val}}{\partial \theta} = \frac{\partial \mathcal{L}_{val}}{\partial \psi} \frac{\partial \psi}{\partial \theta}$$

As described herein, $\psi$ can represent the parameters of a categorical distribution. In this regard, both the terms in the foregoing equation are non-differentiable. Embodiments of the present disclosure can adopt Gumbel-Softmax re-parameterization to obtain a differentiable approximation. A forward pass applying a straight-through gradient estimator can be defined as follows:

$$c = \text{one\_hot}(\operatorname{argmax}_i[g_i + \log \psi_i])$$

where $g_i$ is an independent and identically distributed sample drawn from the Gumbel distribution. A backward pass can utilize differentiable terms that can be defined as follows:

$$c_i = \frac{\exp((\log \psi_i) + g_i)/\tau)}{\Sigma_j \exp((\log(\psi_j) + g_j)/\tau)}$$

The parameter $\tau$ can control the bias variance in distribution, such that $\tau=0$ corresponds to original categorical distribution and $\tau \to \inf$ to uniform distribution.

In accordance with various embodiments described herein, a local feature personalization device, such as local feature personalization device 115 of FIG. 1, can include one or more hardware and/or software components to perform the following pseudo-code algorithm for optimizing the accuracy of local feature detection:

---
Algorithm 1:
---

Parameters: Initialize $w^0$ from a pre-trained checkpoint and initialize $\theta^0$ randomly. Learning rates for $\theta / w$ are $\eta_\theta / \eta_w$. The inner/outer epochs are denoted by $N_O/N_I$ respectively, while $\gamma_w / \gamma_\theta$ are hyper-parameters.
for o = 0, 1, 2, ..., $N_O$ do
  for i = 0, 1, 2, ..., $N_I$ do
    SGD Step on w:
      $w^{t+1} \leftarrow w^t - \eta_w(\nabla_w \mathcal{L}_{val}(w(\theta))$
        $-\eta_w(2\gamma_w \nabla_{ww}^2 \mathcal{L}_{train} \nabla_w \mathcal{L}_{train})$
  end for
  SGD Step on $\theta$:
    $\theta^{t+1} \leftarrow \theta^t - \eta_\theta(\nabla_\theta \mathcal{L}_{val}(w(\theta)))$
      $-\eta_\theta(2\gamma_\theta \nabla_{\theta w}^2 \mathcal{L}_{train} \nabla_w \mathcal{L}_{train})$
end for Output: Local feature network $w$.

With brief reference back to FIG. 3, the flowchart 300 depicts a bilevel optimization framework 300, implementing the algorithm provided above, for improving the accuracy of local feature detection. In accordance with the flowchart 300, images 350 from a set of training images utilized to train a local feature network 320 can be passed through the DWN 330 so that training image pairs are generated. As noted herein, for a given image, an optimal homography matrix 335 can be generated by the DWN 330, so that the optimal homography matrix 335 applied to the image can be transformed, and an optimal transformation of the image can be generated. To this end, the training images 350 and their respective optimal transformations can produce training image pairs 355, described herein as $D_{train}$. The bilevel optimization objective, also known as bilevel loss ("$\mathcal{L}_{bilevel}$") 370, can be a function of the gradient of training loss ("$\nabla \mathcal{L}_{train}$") 360 and the set of validation images ("$D_{val}$") 380. In the inner loop 302, the local feature network parameters 320 can be updated. Similarly, the DWN parameters 340 of the outer loop 302 can be updated.

Figure 4:
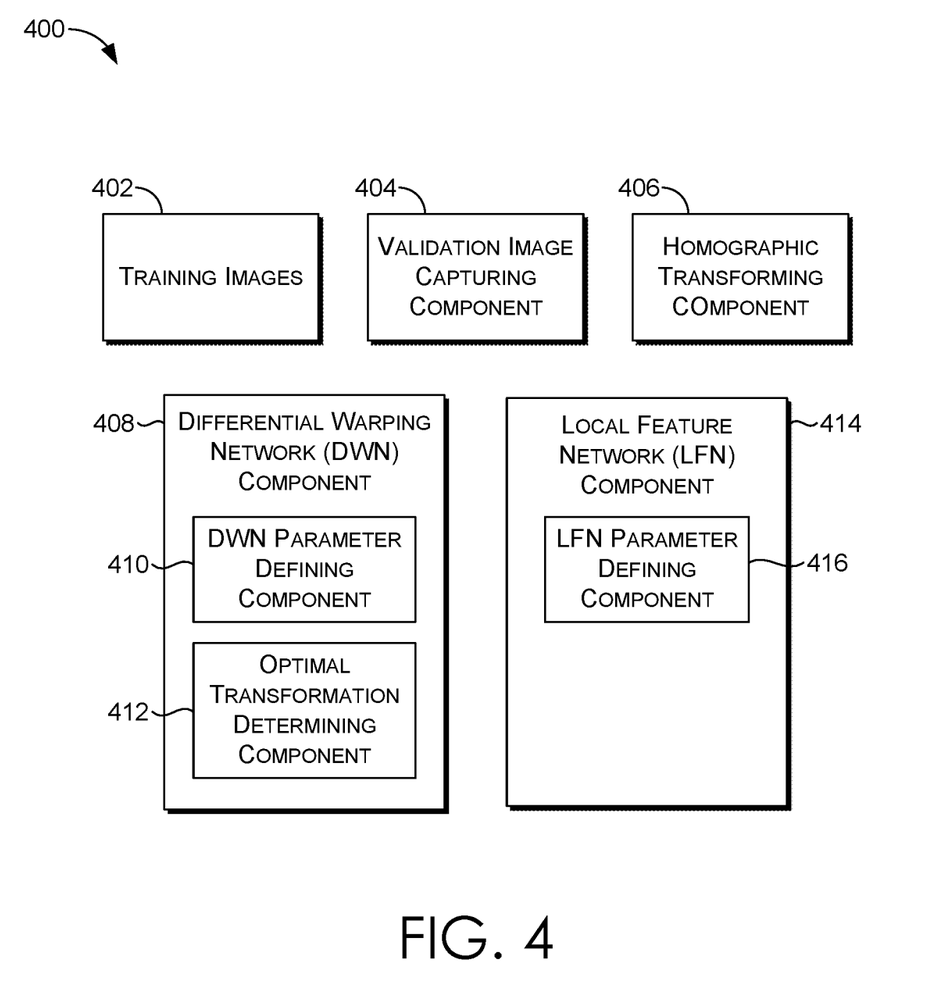
FIG. 4 is block diagram of an exemplary system employing a bilevel optimization framework in accordance with some embodiments of the present disclosure.
Figure 6:
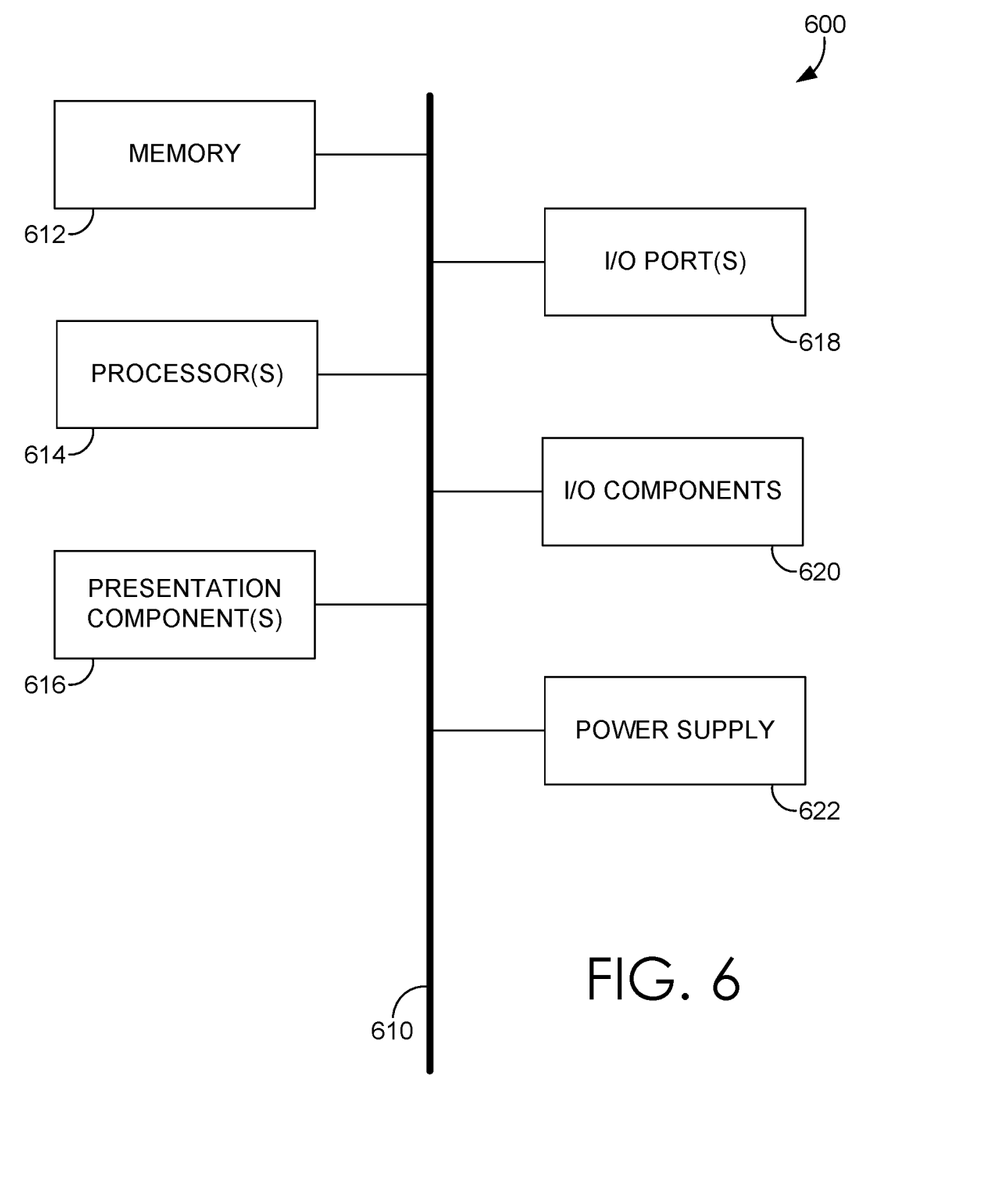
FIG. 6 is a block diagram of an exemplary computing environment suitable for use in implementing some embodiments of the present invention.

Turning now to FIG. 4, FIG. 4 depicts a block diagram of an exemplary system 400 employing a bilevel optimization framework in accordance with various embodiments of the present disclosure. More specifically, the exemplary system can include a local feature personalization device, such as the local feature personalization device 115 of FIG. 1, for optimizing local feature detection in a user's physical environment. The local feature personalization device can include one or more of the components depicted in FIG. 4, one or more computing devices as depicted in FIG. 6, and/or can be coupled to one or more other like computing devices to facilitate the operations described in accordance with the descriptions of FIGS. 1-3. In some embodiments, the system 400 or local feature personalization device can include a computing device, such as the computing device 600 described in relation to FIG. 6 herein. As each of the described components are depicted as being included in an exemplary system 400 or local feature personalization device, it is contemplated that any component depicted therein is not limited to the illustrated embodiment, and can be distributed among a plurality of computing devices, modules, or hardware devices, or in some instances, may be conflated into a single hardware device or module, such as a processor or hardware device. It is also contemplated that any one or more of the described components can be completely removed from the exemplary system 400 or local feature personalization device, so long as one or more operations described in correspondence to a removed component can be compensated for by one or more other components, or a third-party resource, remote computing device, or hardware device, among other things.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, the exemplary system 400 or local feature personalization device can be coupled to head-mounted display (HMD), such as HMD 110 of FIG. 1. As was described in relation to FIG. 1, the system 400 can also be coupled to a set of sensors, such as tracking sensor(s) 120a and environmental sensor(s) 120b of FIG. 1. As briefly described in relation to FIG. 1, any one or more of the tracking sensor(s) 120a and/or environmental sensor(s) 120b can be integrated into or rigidly secured to the HMD in accordance with some embodiments. In various embodiments, the system 400 or local feature personalization device can include, among other things, a validation image capturing component 404, a homographic transforming component 406, a differential warping network (DWN) component 408, and a local feature network (LFN) component 414.

In some embodiments, the system 400 or local feature personalization device can include a validation image capturing component 404 for capturing validation images of a user's current physical environment (i.e., target environment). The validation image capturing component 404 can employ one or more sensors, such as the sensors 120a, 120b of FIG. 1, to capture the images of the target environment. In some further embodiments, the validation image capturing component 404 can further employ the one or more sensors to track and maintain one or more ground-truth homography matrices that define homographic relationships between the various validation images captured by validation image capturing component 404. While the validation image capturing component 404 is described herein as a means for obtaining validation images of a target environment along with ground-truth homography matrices defining the relationships there between, it is contemplated that the validation images and ground-truth homography matrices employed by the system 400 or local feature personalization device can be obtained by other means, such as a network, a memory device, or any other data transfer mechanism, after being captured by one or more other sensors (e.g., camera, tracking sensor, depth sensor, etc.).

In some embodiments, the system 400 or local feature personalization device can include a differential warping network (DWN) component 408 having a DWN parameter defining component 410 for defining and/or updating weights or DWN parameter(s), and an optimal transformation determining component 412 for determining optimal transformations of a given image. In various embodiments, the DWN component 408 can receive one or more training images 402, each of which were employed to train a local feature network of a local feature network (LFN) component 414. The DWN component 408 can receive a training image 402 and generate a training image pair by determining an optimal homography transformation matrix for the training image 402. It is contemplated that the DWN component 408 can select a training image from a plurality of training images employed to train the local feature network of a local feature network (LFN) component 414, and that the selected training image to be received thereby can be selected in sequence or at random.

In some embodiments, the DWN component 408 can include an optimal transformation determining component 412 that includes a computing device, such as the computing device 600 described in relation to FIG. 6, hosting a differentiable warping network (DWN) thereon. As described in accordance with FIG. 2, the DWN of the optimal transformation determining component 412 can comprise a two-layer convolution network for extracting features from a training image 402 as a base. In some further embodiments, a variety of heads of layers (e.g., scale, rotation, shear, translation, reflection) can be fully connected on top of the base.

In accordance with the description accompanying FIG. 2, the DWN of optimal transformation determining component 412 can generate a tuple ($\psi^s$, $\psi^r$, $\psi^{sh}$) of probability vectors. In an embodiment, a scale probability vector ("$\psi^s$") can correspond to the K bins in scale transformation, a rotation probability vector ("$\psi^r$") can correspond to the K bins in rotation transformation, and a shear probability vector ("$\psi^{sh}$") can correspond to the K bins in shear transformation. In some further embodiments, a Gumbel-softmax operation can be applied to each of the probability vectors to determine one-hot vectors ("$c^s$", "$c^r$", "$c^{sh}$"), respectively. A first one-hot vector ("$c^s$") can be drawn from a categorical distribution parameterized by the scale probability vector ("$\psi^s$"). The one-hot vector can help select a precise bin from among K available bins for the scale transformation. A second one-hot vector ("$c^r$") can be drawn from a categorical distribution parameterized by the rotation probability vector ("$\psi^r$"). The second one-hot vector can help select a precise bin from among K available bins for the rotation transformation. Lastly, a third one-hot vector can help select a precise bin from among K available bins for the shear transformation. The third one-hot vector ("$c^{sh}$") can be drawn from a categorical distribution parameterized by the shear probability vector ("$\psi^{sh}$"). With these one hot vectors, the DWN component 408 can select the bins defined by the one hot vectors and generate, as output, an optimal homography transformation matrix for a given input image. In some embodiments, the DWN component 408 can include and/or employ a homographic transforming component 406, which can employ the optimal homography transformation matrix to transform the input training image 402 and generate an optimally transformed version of the training image 402. As previously described herein, for a given training image, an optimal homography matrix can be generated by optimal transformation determining component 412, so that an optimal homography matrix can be applied to the image so that an optimal transformation of the image can be generated. To this end, the DWN component 408 can output one or more training images and their respective optimal transformations to produce training image pairs, described herein as $D_{train}$.

In some embodiments, the system 400 or local feature personalization device can include a local feature network (LFN) component 414 having a LFN parameter defining component 416. The LFN component 414 can, among other things, include a computing device, such as the computing device 600 described in relation to FIG. 6, hosting a local feature network (LFN) thereon. The LFN parameter defining component 416 can define a set of LFN parameters (e.g., weights) associated with the LFN hosted by the LFN component 414.

In various embodiments, the LFN component 414 can receive one or more training image pairs from the DWN component 408 as input. The LFN component 414 can, among other things, determine a gradient of training loss ("$=\mathcal{L}_{train}$") based on the provided training image pairs. The LFN component 414 can further determine a bilevel optimization objective, also referenced herein as a bilevel loss ("$\mathcal{L}_{bilevel}$"), as a function of the gradient of training loss ("$\nabla \mathcal{L}_{train}$") and the set of validation images ("$D_{val}$") captured by validation image capturing component 404 or otherwise obtained by the system 400. In other terms, a first gradient can be calculated for the DWN parameters and a second gradient can be calculated for the LFN parameters based on the determined bilevel optimization objective. In further embodiments, the LFN parameter defining component 416 can employ the second calculated gradient to update LFN parameters, and the DWN parameter defining component 410 can employ the first calculated gradient update the DWN parameters.

In accordance with various embodiments described herein, the system 400 or local feature personalization device can repeat the steps of generating or obtaining training image pairs, capturing or obtaining validation image pairs related by ground-truth homography matrices, determining a bilevel optimization objective associated with the LFN hosted by LFN component 414, calculating first and second gradients based on the determined bilevel optimization objective, and updating the DWN parameters and LFN parameters utilizing the calculated first and second gradients. In further embodiments, the process of repeating these steps can continue until the calculated first and second gradients have reached a minimum threshold or zero. In this way, the LFN parameters of the LFN hosted by LFN component 414 have been tuned, or otherwise optimized, for the target environment of the user. In other words, the validation images from the target environment were employed to facilitate a tuning of the LFN parameters by way of the system or local feature personalization device described herein.

Figure 5:
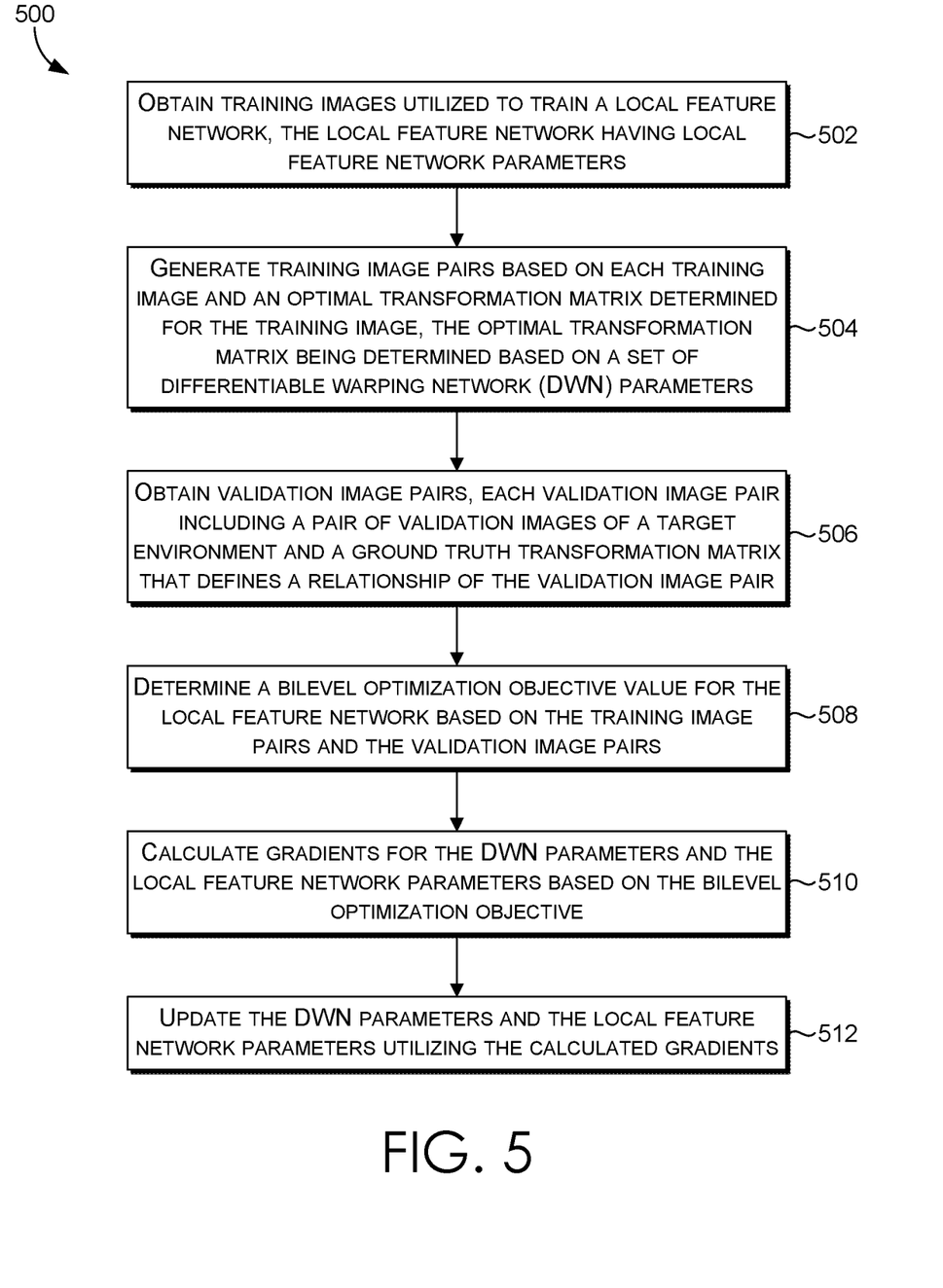
FIG. 5 is a flow diagram showing a method for improving accuracy of local feature detection in accordance with some embodiments of the present invention.

Referring now to FIG. 5, a flow diagram 500 is provided that illustrates a method for improving accuracy of local feature detection, in accordance with various embodiments described herein. As shown at block 502, training images that are utilized to train a local feature network (LFN), such local feature network 310 of FIG. 3, are obtained. In various embodiments, the local feature network can have a set of local feature network parameters or weights associated therewith.

At block 504, training image pairs are generated based on each training image and an optimal transformation of the training image. The optimal transformation of the training image can be generated based on an optimal transformation matrix that is determined for the training image via a differentiable warping network (DWN) Like the local feature network, the differentiable warping network can be associated with a set of differentiable warping network parameters or weights that affect how the optimal transformation matrices are determined, as is described in accordance with various embodiments of the present disclosure. Each training image can be paired with its generated optimal transformation to form a corresponding training image pair.

At block 506, one or more validation image pairs are obtained, where each validation image pair includes a pair of validation images depicting a user's current physical environment (i.e., target environment) and having associated therewith a ground truth homography matrix that defines a homographic relationship between each image in the validation image pair. In some embodiments, the validation image pairs and ground truth homography matrices can be captured via one or more sensors coupled to a HMD, such as HMD 110 of FIG. 1, or received through a network or other storage medium.

At block 508, a bilevel optimization objective for the local feature network is determined based on the training image pairs and the validation image pairs. The bilevel optimization objective can be determined by comparing local features across image pairs from each of the training image pairs and validation image pairs. At block 510, a first gradient for the DWN parameters and a second gradient for the local feature network parameters can be calculated based on the determined bilevel optimization objective. At block 512, the DWN parameters can be updated utilizing the calculated first gradient, and the LFN parameters can be updated utilizing the calculated second gradient. In accordance with various embodiments described herein, each iteration of updating the DWN and LFN parameters results in a more accurate local feature detector and descriptor model (i.e., local feature network), tuned for the current physical environment in which the validation images were captured. In further embodiments, the local feature network having local feature network parameters optimized in accordance with the foregoing steps can be applied (i.e., utilized) for improved feature detection in the physical environment.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, improving the accuracy of local feature detection. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for improving accuracy of local feature detection, the method comprising:
    obtaining a set of training images that were utilized to train a local feature network (LFN) associated with a set of LFN parameters;
    generating a set of training image pairs based on the set of training images, each training image pair of the generated set of training image pairs including one training image of the set of training images and a determined optimal transformation matrix of the training image, wherein the optimal transformation matrix is determined based on a set of differentiable warping network (DWN) parameters;

obtaining, by a device, a set of validation image pairs, each validation image pair in the set of validation image pairs including an image pair of a target environment and a ground truth transformation matrix that defines a homographic relationship of the image pair;

determining a bilevel optimization objective associated with the LFN based on the generated set of training image pairs and the obtained set of validation images;

calculating a first gradient for the set of DWN parameters and a second gradient for the set of LFN parameters based on the determined bilevel optimization objective; and updating the set of DWN parameters and the set of LFN parameters utilizing the calculated first and second gradients, respectively.

2. The method of claim 1, wherein the optimal transformation matrix of the training image is determined utilizing a twice differentiable machine learning model.

3. The method of claim 1, wherein the DWN includes a convolutional network for extracting features of a training image.

4. The method of claim 3, wherein the DWN further includes a set of fully connected layers, each layer of the set of fully connected layers corresponding to one of a plurality of transformation types.

5. The method of claim 4, wherein the plurality of transformation types includes scale, rotation, shear, translation, and reflection.

6. The method of claim 5, wherein the optimal transformation matrix of the training image is determined based further on a set of probability vectors determined via the DWN, each probability vector of the set of probability vectors corresponding to a one-hot vector associated with one of a plurality of transformation types.

7. The method of claim 1, wherein the set of training images is randomly selected from a plurality of training images utilized to train the LFN.

8. The method of claim 1, further comprising:
repeating the steps of generating, obtaining the set of validation image pairs, determining, calculating, and updating, until the calculated first and second gradients reaches a minimum threshold or zero.

9. A computerized system comprising:
one or more processors; and
one or more computer storage media storing computer-usable instructions that, when used by the one or more processors, cause the one or more processors to:
generate a training image pair based on a training image associated with a feature network and a transformation matrix determined for the training image, wherein the transformation matrix is determined based on warping network parameters associated with a warping network;
obtain a validation image pair having an pair of images of a target environment and a ground truth transformation matrix that defines a homographic relationship for the pair of images;
determine an optimization objective value for the feature network based at least in part on the training image pair and the validation image pair;

calculate a set of gradients for the warping network parameters and feature network parameters associated with the feature network based on the optimization objective value; and
update the warping network parameters and the feature network parameters based on the set of gradients.

10. The system of claim 9, wherein the transformation matrix is an optimal transformation matrix that is determined utilizing the warping network.

11. The system of claim 9, wherein the warping network includes a differentiable warping network.

12. The system of claim 11, wherein the feature network was trained based at least in part on the training image.

13. The system of claim 9, wherein the warping network includes a set of fully connected layers, each layer of the set of fully connected layers corresponding to one of a plurality of transformation types.

14. The system of claim 9, wherein the feature network includes a local feature network.

15. The system of claim 9, wherein the training image is randomly selected from a plurality of training images associated with the feature network.

16. The system of claim 9, the one or more computer storage media storing computer-usable instructions that, when used by the one or more processors, further cause the one or more processors to:
repeat the steps to generate, obtain, determine, calculate, and update until the set of gradients reaches zero or a minimum threshold.

17. A computer-implemented method for optimizing a feature model of a local computing device in a target environment, the method comprising:
receiving, by the local computing device, a pair of images captured via a sensor coupled to the local computing device;
determining, by the local computing device, a ground truth transformation matrix that defines a homographic relationship of the pair of images;
communicating, by the local computing device, the pair of images and the ground truth transformation matrix to a different computing device, wherein the different computing device is configured to calculate a set of gradients based at least in part on a validation image pair, the ground truth transformation matrix, and a training image associated with the feature model;
updating, by the local computing device, the feature model based on receipt of the set of gradients from the different computing device; and
detecting, by the local computing device, at least one feature in an image captured via the sensor based on the updated feature model.

18. The method of claim 17, wherein each image of the pair of images depicts a different view of the target environment.

19. The method of claim 17, wherein the feature model is associated with a set of feature model parameters, and updating the feature model includes adjusting the feature model parameters based on the set of gradients.

20. The method of claim 17, wherein the different computing device is further configured to employ a bilevel optimization framework to calculate the set of gradients.

* * * * *